April 10, 1956     J. W. G. WENKE     2,741,170

CAMERA DEVICE OF THE KIND COMPRISING A LENS REVOLVER

Filed July 19, 1951

INVENTOR
JAN W. G. WENKE

BY

AGENT

United States Patent Office 2,741,170
Patented Apr. 10, 1956

2,741,170

CAMERA DEVICE OF THE KIND COMPRISING A LENS REVOLVER

Jan Willem Gerhardus Wenke, Hilversum, Netherlands, assignor to Hartford National Bank and Trust Company, Hartford, Conn., as trustee Application July 19, 1951, Serial No. 237,580

Claims priority, application Netherlands August 8, 1950

2 Claims. (Cl. 95—45)

The invention relates to cameras of the kind comprising a housing and a lens revolver. The latter term is to be understood to mean a plurality of lenses arranged on a common carrier, which is adapted to be shifted or turned relatively to the housing in a manner such that for each shift a different lens or objective comes opposite a window provided in the housing and thus become effective.

Where reference is made here to lenses, this term is to be understood to mean lens systems or objectives in general.

Such lens revolvers are frequently used with microscopes; they are furthermore known to be used in film cameras and television cameras.

The object of the invention is to have the exchange of lenses before the window carried out in a manner such that the operator of the camera knows in a simple manner which lens lies opposite the window at any given moment, without having to divert his eyes from the scene to be taken.

According to the invention the lens revolver comprises a plurality of control members to exchange the lenses, having relatively different shapes. The members, which are preferably shaped in the form of arms may, for example, be formed in part by handles provided with different grooves, ridges, knobs or other extensions or recesses. The difference may be constituted both by number and by shape.

The number of control members will, in general, be equal to the number of lenses which the revolver is capable of carrying, although the failing of a member is not a source of trouble and may be per se characteristic of a particular position of the revolver. If not all the lenses the revolver is capable of carrying are available, the number of control members may be reduced accordingly.

According to a preferred embodiment of the invention the control members are rotatable about their longitudinal axes, coupled with one another and secured to an adjusting member of the lenses, for example, to the diaphragm or the range finder. Of course, the control members may act each on an adjusting member of one of the lenses.

The arms generally occupy their most favourable position in the plane in which the carrier is adapted to slide which is approximately at right angles to the direction of motion of the lens.

If the lens revolver is formed by a rotatable disc, which is usually the case, a most favourable shape of the arms consequently is that of radially extending spokes. Sometimes the lens revolver is constituted by a slidable sledge. In this case the best position of the arms is square to the direction of movement of the sledge.

In order that the invention may be more clearly understood and readily carried into effect, it will now be described more fully with reference to the accompanying drawing, in which Fig. 1 is a front view of a camera comprising a lens revolver according to the invention.

Figures 1, 2:
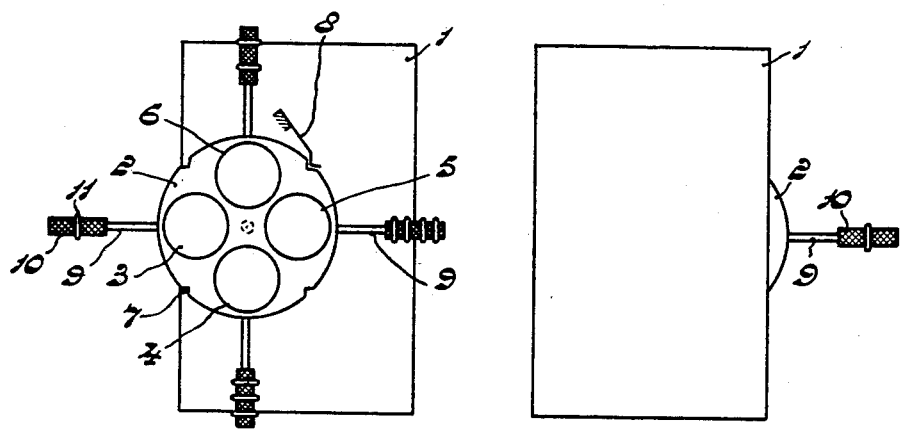
Fig. 2 is a rear view of the same camera.

The camera comprises a housing 1 on the front side of which is secured a rotatable circular metal disc 2. It is the carrier of four lenses or lens systems 3 to 6. Behind the disc, in the center of the housing, in the area of the lens 5 provision is made of a window, through which the lens 5 can project the light onto a film or the screen of a recording tube in the case of a television camera.

At the periphery of the carrier, provision is made of four recesses 7, which by co-operating with a resilient lug 8, determine four positions.

Four arms 9 are also secured to the carrier and extend radially in the plane of the carrier. The arms are all of different shapes, in this case by providing at the ends handles 10, having ridges 11, the number of which varies with the different arms.

Consequently it is easy for the operator behind the camera to determine by touch, which lens is operative at a certain moment (Fig. 2).

The arms may at the same time be used for adjusting the lenses, i. e. to vary their distance from the film or the screen or for controlling the diaphragm.

Figure 3:
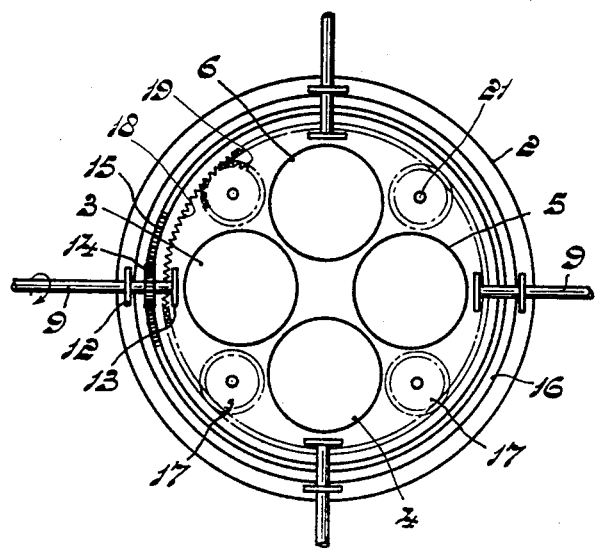
Fig. 3 shows the position of a few parts of the revolver.
Figure 4:
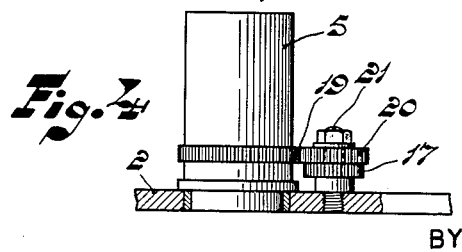
Fig. 4 is a side view of a gear, coupled with a lens.

Referring to Fig. 3 the circular carrier is again designated 2. Each of the four arms 9 are rotatably supported in two bearings 12 and 13. Each arm is provided with a pinion 14, which engages a toothed rim 15, provided on a ring 16, which moves closely about the periphery of the carrier 2. The inner side of this ring is also provided with teeth 18 co-operating with four gear wheels 17. Each of the latter is coupled in a manner not shown in Fig. 3, but in Fig. 4 with an adjusting part 19 of one of the lenses 3 to 6. The part 19 may be connected for instance with the diaphragm of the lens. The couplings consist of a gear wheel 20 which is connected to the wheel 17 and rotates on the same axis 21. The wheels are preferably different from one another to such an extent that notwithstanding the difference between the lenses, the latter can be interchanged without the need for further means, for example in the case of the adjustment of the diaphragm, and that the relative aperture for all the lenses is the same.

What I claim is:

1. A camera comprising a housing, a plurality of lenses, a lens revolver carrying said lenses and mounted for rotation on said housing, said lens revolver being adapted to move each of said lenses successively into proper optical alignment with the camera window, rotational positional means for said lens revolver, a plurality of control arms on said lens revolver extending radially therefrom and adapted to be rotated for positioning each of said lenses in proper optical alignment with the camera window, a lens aperture adjusting member for each lens, bearing means for rotatably supporting each of said control arms on said lens revolver, and gear means on said control arms and said lens revolver for coupling said control arms to said lens revolver whereby the relative aperture for all said lenses are the same.

2. A camera comprising a housing, a plurality of lenses, a lens revolver carrying said lenses and mounted for rotation on said housing, said lens revolver being adapted to move each of said lenses successively into proper optical alignment with the camera window, rotational positioning means for said lens revolver, a plurality of members each having a handle portion and extending radially from said lens revolver whereby said members are adapted to be rotated for positioning each of said lenses in said proper optical alignment with the camera window, lens adjustment means for each of said lenses, and each of said handle portions having a different shape, bearing means for rotatably supporting each of said control arms on said lens revolver, and gear means on said control arms and said lens revolver for coupling said control arms to said lens revolver whereby the relative adjustments for all said lenses are the same.

References Cited in the file of this patent

UNITED STATES PATENTS

| | | |
|---|---|---|
| 494,128 | Decker | Mar. 28, 1893 |
| 1,754,357 | Gordon | Apr. 15, 1930 |
| 1,883,943 | Kindlemann et al. | Oct. 25, 1932 |
| 2,236,069 | Robinton | Mar. 25, 1941 |
| 2,496,269 | Cisski | Feb. 7, 1950 |
| 2,510,360 | Zuber | June 6, 1950 |
| 2,523,067 | Sherry | Sept. 19, 1950 |